INVENTOR.
L. D. BURGESS

United States Patent Office
3,355,659
Patented Nov. 28, 1967

3,355,659
PROGRAMMABLE TEST APPARATUS FOR SUPPLYING SELECTED CURRENT LEVELS TO THE COIL OF A RELAY TO BE ADJUSTED
Laurance D. Burgess, Galloway, Ohio, assignors to Western Electric Company, Incorporated, New York, N.Y., a corporation of New York
Filed Mar. 26, 1964, Ser. No. 354,922
4 Claims. (Cl. 324—28)

ABSTRACT OF THE DISCLOSURE

An electrical device for selectively and separately supplying different levels of current to a coil of a relay being adjusted includes selected precision resistors which monitor the specific current through the relay coil during an adjustment procedure to develop a voltage which is compared with a standard voltage. If the developed voltage does not compare favorably with the standard voltage, compensating circuits facilitate the adjustment of the level of current through the selected precision resistor and the relay coil to the desired level.

Field of the invention

This invention relates to a programmed current supply, and particularly relates to the programming of required currents to facilitate accurate and efficient adjusting of various types of switching devices.

Background of the invention

With the increasing need for larger and more complex switching systems, a demand for various types and amounts of relays has become increasingly significant. Coupled with this demand is the necessity for additional manufacturing facilities, including new manufacturing techniques, as well as accurate and efficient systems for adjusting the relays for use with the complex switching units.

In the past, relays were individually connected to an adjusting set wherein an operator would manually set various controls on the set to provide the prescribed current for the relay wherein the control settings and the current desired had to be read from a specification card. In addition, various individual currents required for the respective tests for a given relay necessitated adjustment of the controls for each specified current. Hence, the operator consumed considerable time in reading the information on the specification card and thereafter sequentially setting the controls on the adjusting set to provide the individual specified currents for the relay. By utilizing such a time-consuming technique, it is apparent that a problem has developed with the expanding need for various types and volumes of relays utilized in the switching systems.

Summary of the invention

It is, therefore, an object of this invention to accurately and rapidly provide various required currents for a device.

Another object of the invention is the provision of a programmed relay adjusting set for providing specified currents when required.

With these and other objects in view, the present invention contemplates a programmed current supply having means for controlling an indicating means to visually inform an operator of the numbers of levels of current to be supplied to a device. In addition, the controlling means is responsive to the supplying of a current to the device other than the required level of current at any given period and indicates to a current supply, which supplies current to the device, the presence of the undesired current, whereby the output of the current supply is modified to provide the required level of current.

Other objects and advantages of the invention will be more readily understood from the following detailed description of the set when read in conjunction with the appended drawing.

Detailed description

Figure 2:
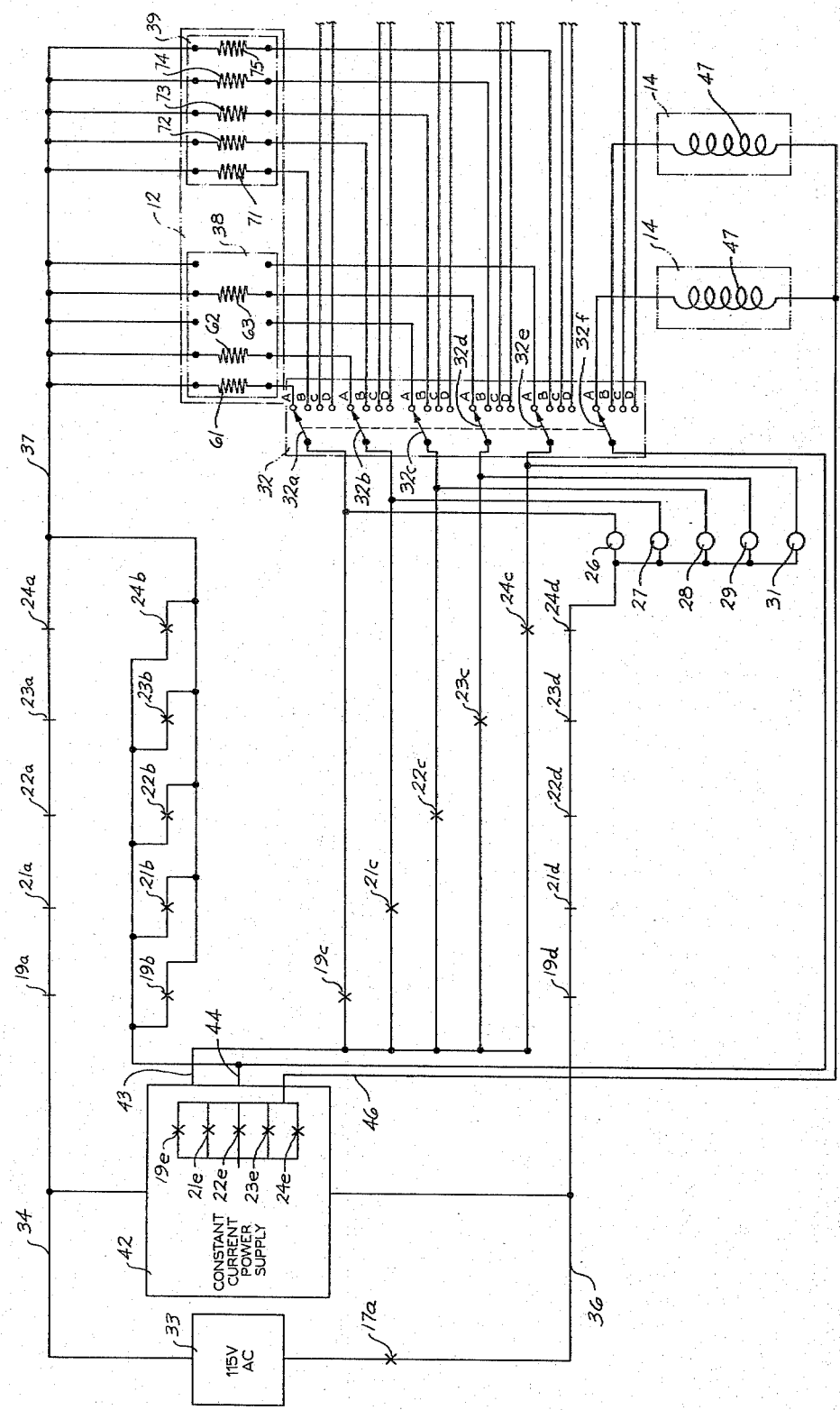
FIG. 2 is an electrical schematic showing a switching system utilized in the adjusting set with a program module connected thereto.
Figure 3:
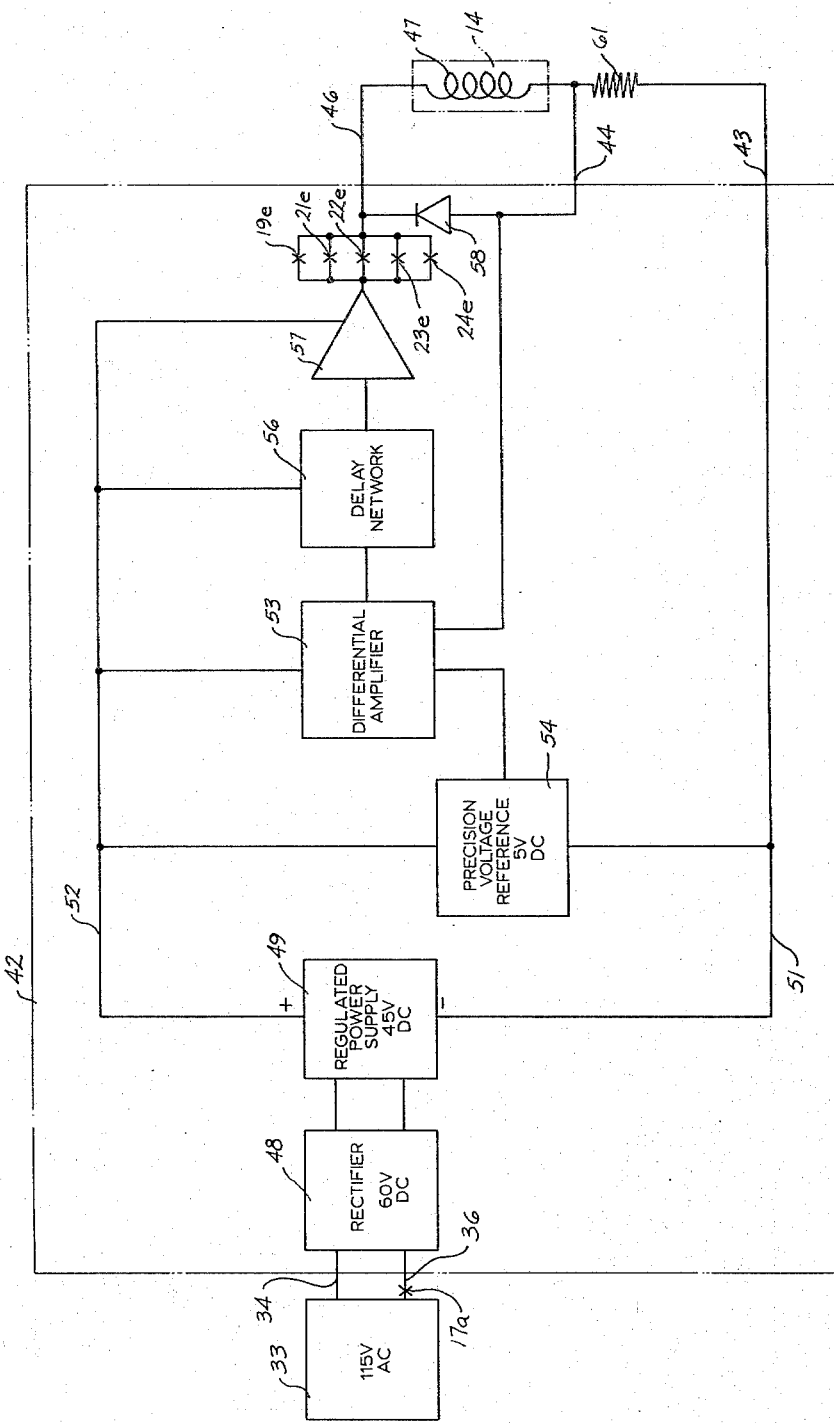
FIG. 3 is a block diagram showing a circuit utilized in the adjusting set during the application of a specified current to a relay coil.

It is to be noted that FIGS. 2 and 3 employ a type of notation referred to as "detached contacts" in which a line perpendicular to a circuit lead represents normally closed contacts and X represents normally open contacts, "normally" referring to the unoperated condition of a relay or other contact controlling device. For a complete exposition of this type of notation, reference should be made to an article entitled "Improved Detached Contact Circuit Drawing" by F. T. Meyer, vol. 74, Electrical Engineering, p. 645, August 1955. It is further noted that the contacts associated with the representative switches will be individually denoted by a letter following the number of the switch, for example, the "a" contact of switch 19 will be designated contact 19a.

Adjusting of relays for various operational characteristics requires the selective application of different amounts of current to the relay whereupon an operator mechanically adjusts the relay to function in the prescribed manner at the various levels of current. Initially, a soak current is applied to the relay to develop an inherent residual magnetism which is representative of the residual magnetism apparent in the relay during environmental use. Thereafter, the soak current is removed and an operational current is applied to the relay while the operator mechanically adjusts the relay for operation at this level of current. Before removing the operational current, a hold current is applied to the relay wherein the hold current is less than the operational current but is of such a value that the relay should remain in operation in the event the operational current is removed.

Thereafter, the operational current is removed to determine whether or not the relay will remain in operation with the presently applied hold current. In the event the relay does not remain in operation, the operator mechanically adjusts the relay and then applies the operational current to operate the relay and subsequently removes this current after applying the hold current. This process is continued until the relay remains in operation at the level of the hold current after the operational current has been removed.

Thereafter, a release current, which is at a lower level than the operational and hold currents, is applied to the relay and the hold current is removed. At this time, the relay should release and discontinue operation. If this does not occur, the operator mechanically adjusts the relay so that the relay will release at this level of current. Subsequently, a non-operate current, which is at a current level between the release and hold current levels, is applied to the relay to indicate whether or not the relay will operate at such a relatively low level of current. In the event the relay does operate with the application of the non-operate current, the operator mechanically adjusts the relay to compensate for this undesirable feature.

Figure 1:
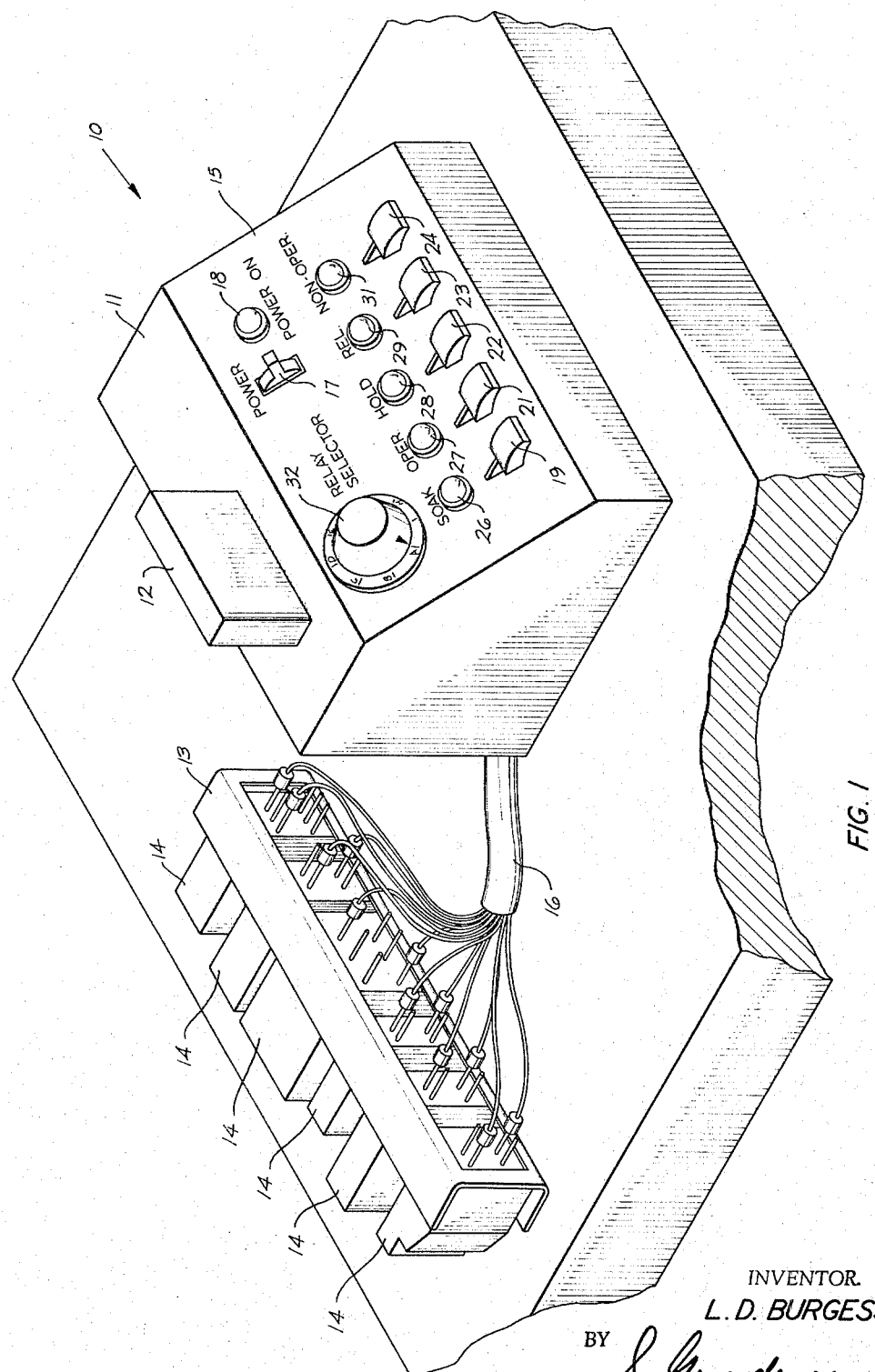
FIG. 1 is a perspective view of a housing supporting an adjusting set revealing control knobs and a relay bank connected to the set.

As shown in FIG. 1, a relay adjusting set, designated generally by the reference number 10, is provided with a housing 11 having terminations (not shown) for receiving interchangeable program modules 12—12. Further shown in FIG. 1 is a mounting plate 13 having a plurality of different types of relays 14—14 attached thereto. A cable 16 is provided with conductors for connecting the relays 14—14 to the adjusting set 10. The program module 12 provides information for selectively applying different levels of current to each relay 14 for the various adjustments and further provides information for sequentially adjusting a plurality of relays. In addition, the relays 14—14 may each be different from the other relays and further, may be attached to the mounting plate 13 in a different orientation from the orientation of relays attached to previous and subsequent mounting plates. Hence, different program modules 12—12 may be required for the variously arranged relays 14—14 of successive mounting plates 13—13. Therefore, each program module 12 is provided with coded information with printed data on the module to indicate to the operator which modules are associated with the respective relay orientation on the mounting plates 13.

In addition to the program module 12, a switch 17 extends from a control panel 15 of the housing 11 for providing A.C. power for the operation of the adjusting set 10. An operation lamp 18 is positioned adjacent the switch 17 and is illuminated to indicate that the set is in an operative condition. A series of switches 19, 21, 22, 23 and 24 are positioned in a horizontal row on the control panel 15 of the housing 11 and are associated with the soak, operational, hold, release, and non-operate currents, respectively, and denote the maximum number of possible levels of current to be supplied to the selected relays 14—14. It is noted that these switches will lock in the closed position when pushed upwardly and will also close when pushed downwardly but are spring-biased to return to the open position when released.

In addition, a horizontal row of lamps 26, 27, 28, 29 and 31 are mounted in the control panel 15 of the housing 11 and are associated respectively with the previously mentioned switches 19, 21, 22, 23 and 24 and indicate which switches are to be operated during an adjustment period. A rotary switch 32, having a plurality of positions represented by the letters A–H, extends from the control panel 15 of the housing 11 and determines which relay 14 is connected to the adjusting set 10 and further assures that the respective portion of the program module 12 associated with that relay is also connected within the adjusting set to provide the information to the set, whereby the various desired levels of currents are selectively and separately supplied to the relay. It is noted that some relays 14—14 do not require all of the five previously mentioned adjustments.

During an adjustment cycle, the operator examines the various types and orientation of relays 14—14 attached to the mounting plate 13 and determines which program module 12 is associated with this arrangement. Thereafter, the operator inserts the program module 12 into terminations (not shown) of the adjusting set 10 and further connects the relays 14—14 to the adjusting set by utilizing the cable 16. The rotary switch 32 is positioned on a selected position, for example position A, representative of the first relay 14 on the mounting plate 13 to be adjusted. Thereafter, the power switch 17 is closed to provide the operational A.C. power for the adjusting set 10. As A.C. power is applied to the adjusting set 10, some, or all of the lamps 26, 27, 28, 29 and 31 are illuminated, depending upon the coded information of the program module 12 indicating the required adjustments for the selected relay 14. For example, if only the soak, operational and release adjustments are required for the selected relay 14, only lamps 26, 27 and 29 would be illuminated as controlled by the program module 12. This is an indication to the operator that only these three adjustments are required for this particular relay 14.

Therefore, the operator momentarily depresses switch 19 to provide the soak level of current for the relay 14 being adjusted. As the switch 19 is depressed by the operator, the A.C. power is removed from the indicating lamps 26, 27 and 29, which were illuminated previously to indicate the adjustments to be performed, whereby the lamps are turned off and an internal power supply delivers direct current to the respective relay 14. Upon the releasing of the depressed switch 19 by the operator, the biasing spring action returns the switch to the open position and the A.C. power is again applied whereby the lamps 26, 27 and 29 are again illuminated.

The operator then depresses switch 21 below the lamp 27 which results in the application of the operate level of current to be applied to the relay 14. In the event adjustments are required during this period, the operator can push the switch 21 upwardly, whereby the switch is locked into the closed position and the operator is free to make the required adjustments. In addition, a foot switch could be utilized in place of the locking feature of switch 21, whereby the operator controls the switch by foot.

Upon the completion of the adjustments at the operate level of current, the operator depresses the switch 23 to apply the release level of current to the relay 14 and then opens the switch 21 to remove the operate level of current therefrom. At this time, the relay 14 should release with the level of release current being applied thereto. In the event the relay 14 does not release, the operator places the switch 23 in the locked position and makes the necessary adjustments so that the relay releases at the value of current assigned to the release current for the particular relay being adjusted.

Upon completion of the adjusting of the first relay 14, the operator moves the rotary switch 32 to a second designated level, for example position B, thereby connecting the second relay 14 to the adjusting set 10 and disconnecting the first relay 14 from the test set. In addition, positioning of the rotary switch 32 disconnects the portion of the program module 12 associated with the first adjusted relay 14 from the adjusting set 10 and connects the set with that portion of the module associated with the second relay 14 to be adjusted. At this time, a different arrangement of illuminated lamps may possibly appear, depending upon whether the second relay 14 to be adjusted calls for different requirements relative to those requirements of the first relay. Assuming that all five lamps 26, 27, 28, 29 and 31 are illuminated, the adjusting procedure will be in accordance with that previously discussed wherein all possible levels of current are applied selectively and separately to the second relay 14 during the adjusting cycle. This pattern is continued wherein successive relays 14—14 and successive portions of the program module 12 are connected to the adjusting set 10 by operation of the rotary switch 32 so that the adjusting cycle for each of the respective relays may be completed.

As shown in the schematic of the adjusting set 10 represented in FIG. 2, the rotary switch 32 is provided with ganged contactors 32a, 32b, 32c, 32d, 32e and 32f for completing internal circuits for the indicating lamps 26, 27, 28, 29 and 31 and the individual relays 14—14, respectively. As shown, associated levels of terminals A, B, C, D are shown for switch 32 wherein terminals A and B of respective levels 32a through 32e are connected to the program module 12 and terminals A and B of level 32f are connected to respective relays 14-14. In addition terminals C and D are shown to represent additional connections to the program module 12 and additional relays 14—14 to be adjusted. It is noted that the number of terminals A through D of switch 32 is not to be construed as a limitation on the maximum number of available connections to the program module 12 and to relays 14—14 to be adjusted but merely manifests the manner in which such connections are made.

A 115 volt A.C. power supply 33 is provided for supplying the D.C. operating potential, after filtering, for the adjusting set 10 through a contact 17a of the power switch 17 and is connected between lines 34 and 36. A plurality of normally closed contacts 19a, 21a, 22a, 23a and 24a, associated with the switches 19, 21, 22, 23 and 24, respectively, are connected in series between the line 33 and a line 37. An additional plurality 19d, 21d, 22d, 23d, and 24d, also associated with the switches 19, 21, 22, 23 and 24, respectively, are connected in series with the line 36.

The program module 12 is provided with a plurality of program units associated with a corresponding plurality of the relays 14—14 to be adjusted wherein the units are represented by a pair of units 38 and 39, each of which is provided with a plurality of available circuit paths, some or all of which may be completed with precision resistors such as resistors 61, 62 and 63 of program unit 38 and resistors 71 through 75 of program unit 39.

As shown in FIG. 2, the program module 12 is provided with the pair of units 38 and 39 but may include additional units depending upon the number of relays 14 to be adjusted for a given mounting frame 13. In addition, the number of program resistors provided in each program unit depends upon which of the five previously mentioned adjustments are to be made to the respective relays 14—14. For example, as shown in the program unit 38, only three program resistors 61, 62 and 63 are represented, thereby indicating that only the soak, operate and release adjustments are to be made to the respective relay 14 while the second unit 39 is provided with five program resistors 71 through 75, indicating that the soak, operate, hold, release and non-operate adjustments are to be made to the respective relay. A common side of each of the program resistors of the units 38 and 39 are connected to the line 37 and through the normally closed contacts 19a, 21a, 22a, 23a and 24a to the line 34 while the opposite sides of the resistors of the units are connected to the plurality of terminals A and B, respectively, associated with the contactors 32a 32b, 32c, 32d and 32e of the rotary switch 32. The contactors 32a, 32b, 32c, 32d and 32e are connected in series with one side of the lamps 26, 27, 28, 29 and 31, respectively, while the opposite sides of these lamps are connected in common with the line 36 through the normally closed contacts 19d, 21d, 22d, 23d and 24d.

A constant current D.C. power supply 42 (FIGS. 2 and 3) is connected between the lines 34 and 36 and utilizes the A.C. power supply 33 as a potential source for the components of the current power supply. Three output lines 43, 44 and 46 extend from the constant current power supply 42 wherein coils 47—47 associated with the relays 14—14 are connected respectively between lines 44 and 46 when the contactor 32f of the rotary switch 32 is placed on the respective terminals A and B. In addition, a series of normally open contacts 19b, 21b, 22b, 23b and 24b, associated with the switches 19, 21, 22, 23 and 24, respectively, are connected in parallel between the line 44 and the line 37. An additional plurality of normally open contacts 19c, 21c, 22c, 23c and 24c, associated with the switches 19, 21, 22, 23 and 24, respectively, are connected on one side thereof to the contactors 32a, 32b, 32c, 32d and 32e, respectively, and are further connected commonly on the opposite side thereof to the line 43.

Subsequent to the connection of the coils 47—47 of the relays 14—14 to the adjusting set 10, a first phase of operation is initiated whereby the switch 17 is operated so that the contact 17a is closed to apply the A.C. operating potential of the power supply 33 to the set. Since the contactors of the rotary switch 32 are positioned on the terminals A, the three individual program resistors 61, 62 and 63 of the program unit 38 are connected in series with the contactors 32a, 32b and 32d, respectively, and are further connected in series with the lamps 26, 27 and 29, respectively. It is noted that there are five possible circuit paths available in each of the program units 38 and 39 but only three of the maximum available paths are completed in unit 38 by resistors 61, 62 and 63.

The potential of the A.C. power source 33 is applied across the respective, serially connected resistors, contactors and lamps through the various normally closed contacts of the switches 19, 21, 22, 23 and 24, whereby the lamps 26, 27 and 29 will be illuminated, thereby indicating to the operator that the adjustments associated with these lamps, namely soak, operate and release, are to be made to the relay 14, the coil 47 of which is connected in series with the contactor 32f. Since the lamps 26, 27, 28, 29 and 31 are positioned above the switches 19, 21, 22, 23 and 24, respectively, as shown in FIG. 1, the operator can condition the set 10 for selectively providing desired current levels through the relay coil 47 being adjusted by depressing separately those switches beneath the illuminated lamps indicative of an adjustment procedure to follow immediately thereafter.

An example of such an operation is noted wherein the lamp 26 is illuminated to indicate that the soak current level is called for by the program module 12. Thereafter, a second phase of operation is initiated whereby the operator depresses the switch 19 which is directly beneath the illuminated soak-indicating lamp 26 on the control panel 15 of the housing 11 so that normally closed contacts 19a and 19d are opened to remove the A.C. power supply 33 from the circuit whereby all of the previously illuminated lamps are turned off. Simultaneously, however, the normally open contacts 19b and 19c of the switch 19 are closed, whereby the first resistor 61 of the unit 38, which was previously connected in series with the soak-indicating lamp 26, is now connected between the lines 43 and 44 extending from the constant current D.C. power supply 42. In addition, a contact 19e of the switch 19 is closed within the current supply 42 to complete a circuit which includes the resistor 61 of the unit 38 connected in series with the leftmost coil 47 as shown in FIG. 2.

As shown on FIG. 3, a block diagram schematic reveals generally the electrical components of the constant current power supply 42 and further shows the manner in which the adjusting set 10 is connected during the period when one of the adjustment currents is being supplied to the relay coil 47, for example when resistor 61 is connected in the circuit. The 115 volts A.C. power supply 33 is connected to a rectifier 48 for providing a 60 volts D.C. output through the closed contact 17a. The output of the rectifier 48 is fed to a power source regulator 49 which provides a regulated 45 volts D.C. between lines 51 and 52. A bank of shunt-connected, normally-open contacts 19e, 21e, 22e, 23e and 24e associated with the switches 19, 21, 22, 23 and 24, respectively are connected within the current supply 42 to preclude the application of the 45 volts to the coil 47 prior to the necessity for such application as indicated in the second phase of the operation.

As the current is supplied to the program resistor 61, a voltage is developed thereacross which is representative of the current flowing therethrough. As provided in the selection of the program resistors, the voltage developed across each of the resistors, for example resistor 61, should be of a certain value determined by the required current level for the particular adjustment of the relay 14. For example, assume that a 5 volt potential should appear between the lines 43 and 44 when the required current is flowing through the relay coil 47 and the resistor 61 during a given adjustment period. The value of the program resistor 61, and the remaining program resistors, will be in accordance with Ohms Law wherein the desired voltage value, 5 volts, is divided by the required current for the given adjustment. Hence, if the current provided by the power supply 42 is of a value different from that required, the voltage appearing across the program resistor 61 will be of some value other than 5 volts.

However, the resistor 61 senses the voltage appearing thereacross and feeds back information, in the form of the developed voltage, through the line 44 to a differential amplifier 53 within the current supply 42 indicating the presence of an undesirable current level in terms of voltage. A precision voltage reference 54 is connected between the lines 51 and 52 and provides a precision 5 volts D.C. reference which is coupled to the differential amplifier 53. The sensed voltage appearing across the program resistor 61 is then compared with the precision 5 volts D.C. reference and the differential amplifier 53 provides an output through a delay network 56 which controls the current flow from an amplifier 57 to the relay coil 47 and the program resistor 61, thereby compensating for the difference in current level from the desired level and modifying the current supply output to supply the required level of current. It is noted that, if there is a 5 volt potential appearing across the program resistor 61, there is no differential at the differential amplifier when compared with the precision 5 volts. Therefore, no output will result from the differential amplifier 53, since the level of current flowing through the relay coil 47 is the desired level.

Since it is the natural characteristic of a coil to oppose a change in current flow therethrough, a delay problem could result in the slow reaction of the coil 47 to the decrease of the current when the circuit is switched from one program resistor to another resistor, for example, from resistor 61 to resistor 62 for a subsequent adjustment. To overcome this aspect, a diode 58 has been connected within the current power supply 42 between the lines 44 and 46 to provide a relatively low resistance path for current developed within the coil 47 as the field about the coil collapses during the switching from one resistor to another. In addition, the current rise to the desired value is extremely fast due to the sensing arrangement of the resistor, for example resistor 61, and results in an increased application of voltage across the relay coil 47 in an attempt to reach the desired current level. The fast current rise could result in the relay 14 operating at a current value slightly higher than that which is normally required.

To compensate for this problem the delay network 56 was provided to increase the time for current to rise to full value. Hence, the program resistor, for example resistor 61, functions as a sensing device and feeds back information concerning a current level which is other than a level required during the given adjustment period. If the program resistor 61 should sense a current level other than the required level, the resistor responds by providing a feed back of information in terms of voltage to the differential amplifier 53 indicating that the current is not at the required level. This voltage is then compared in the differential amplifier 53 with the precision voltage level indicative of the voltage which should appear across the program resistor 61. The differential amplifier 53 thereafter provides a modified output which compensates for the presence of the undesired current level wherein the programmed current level is attained and provided for the relay coil 47.

The value of the program resistor, for example resistor 62, utilized in the next adjusting cycle is determined in the same manner as the previous resistor 61 wherein the voltage appearing across the resistor 62 should also be 5 volts when the required current level is flowing through the resistor 62. Hence, the values of each of the program resistors 61, 62, 63 and 71 through 75 are determined in the same manner and the resistors are separately and selectively connected in the circuit, as shown in FIG. 3, to sense the current level and to indicate to the constant current power supply 42 in terms of voltage the presence of a current level other than that required for a given adjusting period.

Referring to FIG. 2, upon the completion of the adjusting cycle of the first relay 14 associated with the program unit 38, the rotary switch 32 is moved to the next position whereby the contactors are resting on the terminals B. At this time, the program unit 39 is connected into the circuit to illuminate the indicating lamps 26 through 29 and 31, informing the operator which adjustments are to be made upon the second relay 14. In addition, the contactor 32f of the rotary switch 32 is positioned on terminal B so that the second relay coil 47 will receive the programmed current flowing therethrough when the respective switches 19, 21, 22, 23 and 24 are selectively and separately closed.

It is to be understood that the above-described arrangement is simply illustrative of the invention. Other arrangements may be devised by those skilled in the art which will employ the principle of the invention and fall within the spirit and scope thereof.

What is claimed is:
1. Apparatus for selectively supplying various required levels of current to a coil, which comprises:
 a program module having a plurality of circuits for supplying coded information indicative of the required levels of current,
 means responsive to the information of and connected to the circuits of the program module for indicating which of a plurality of available levels of current are to be serially and separately supplied to the coil,
 means for supplying the various levels of current to the coil,
 switching means associated with the indicating means for disconnecting the program module from a circuit including the indicating means and connecting the program module in a circuit including the coil and the current supply means so that a current is supplied to the program module and the coil, and
 means responsive to the supply of current to the program module and the coil when the value of the supplied current is other than the required level for developing and feeding a signal to the current supply means, whereby the output of the supply means is modified to supply the required level of current in accordance with the information of the program module.

2. Apparatus for supplying required levels of current selectively and separately to a coil of a relay during an adjusting cycle, which comprises:
 a program module providing coded information indicative of the number of levels of current to be selectively and separately supplied to the coil of a given relay for an adjusting cycle,
 a plurality of indicating lamps equal in number to the maximum levels of current required for the adjusting of a relay,
 means for connecting the plurality of indicating lamps to the program module,
 a first power supply connected in a circuit including the program module and lamps, whereby various lamps are illuminated in accordance with the information supplied by the program module to indicate visually the number of levels of current to be supplied separately and selectively to the coil of the relay,
 a second power supply for supplying the current to the coil during an adjusting period,
 means for disconnecting the first power supply from the program module and the lamps,
 means associated with the lamps for connecting the second power supply and the program module with the coil of the relay, whereby levels of current are selectively and separately applied to the program module and the coil, and means responsive to the supply of levels of current other than the required levels for modifying the output of the second power supply, whereby required levels of current are thereafter supplied to the coil of the relay during the adjusting period.

3. The relay adjusting device of claim 2 in which the program module comprises:

a plurality of available circuits corresponding to the maximum possible number of levels of current required for the coil of a relay during an adjusting cycle, and at least one current value determining element connected in each of the available circuits corresponding to the number of levels of current to be supplied to the coil of the given relay during an adjusting cycle.

4. A device for selectively and separately supplying various required levels of current to a coil, which comprises:

a program module having a plurality of available individual circuits wherein the number of completed circuits within the program module is indicative of the number of levels of current required to be supplied selectively and individually to the coil, each completed circuit having at least one resistor connected therein having a resistance value related to the level of current to be supplied to the coil, a plurality of indicating lamps corresponding to and respectively connected in series with the available circuits of the program module, a power supply connected across the serially connected program module and lamps for supplying power to the module and the lamps, whereby the lamps connected in series with the completed circuits of the program module are illuminated to indicate the number and levels of current to be selectively and individually supplied to the coil, means for supplying the various levels of required current to the coil, switching means having contacts connected to the indicating lamps and the power supply and contacts connected to the circuits of the program module and the current supply means for selectively and individually disconnecting the power supply and the lamps from the program module and for connecting the resistors of the program module serially and individually with the coil and the current supply so that respective levels of current are supplied to the coil, and means responsive to a signal developed across the respectively connected resistors when a value of current other than the required level is supplied to the coil for modifying the current supply means so that the required levels of current are respectively supplied to the coil.

References Cited

UNITED STATES PATENTS

| | | | |
|---|---|---|---|
| 2,774,032 | 12/1956 | Burdge | 323—22 |
| 3,044,007 | 7/1962 | Akers | 323—22 |
| 3,142,798 | 7/1964 | Schwarz | 324—74 |
| 3,226,560 | 12/1965 | Staschover | 343—22 |

RUDOLPH V. ROLINEC, *Primary Examiner.*

WALTER L. CARLSON, *Examiner.*

E. L. STOLARUN, *Assistant Examiner.*

UNITED STATES PATENT OFFICE
CERTIFICATE OF CORRECTION

Patent No. 3,355,659                          November 28, 1967

Laurance D. Burgess

It is certified that error appears in the above identified patent and that said Letters Patent are hereby corrected as shown below:

In the heading to the drawings, sheets 1 to 3, line 4, "May 26, 1964", each occurrence, should read -- March 26, 1964 --. Column 4, line 15, "lluminated" should read -- illuminated --.

Signed and sealed this 21st day of October 1969.

(SEAL)
Attest:

Edward M. Fletcher, Jr.                       WILLIAM E. SCHUYLER, JR.
Attesting Officer                                Commissioner of Patents